(12) United States Patent
Willms et al.

(10) Patent No.: US 12,723,002 B2
(45) Date of Patent: Sep. 1, 2026

(54) METHOD AND DEVICE FOR PRODUCING CEMENT CLINKER

(71) Applicants: thyssenkrupp Polysius GmbH, Beckum (DE); thyssenkrupp AG, Essen (DE)

(72) Inventors: Eike Willms, Dortmund (DE); Constantin Kimmig, Soest (DE)

(73) Assignees: thyssenkrupp Polysius GmbH, Beckum (DE); thyssenkrupp AG, Essen (DE)

( * ) Notice: Subject to any disclaimer, the term of this patent is extended or adjusted under 35 U.S.C. 154(b) by 414 days.

(21) Appl. No.: 18/563,814

(22) PCT Filed: May 23, 2022

(86) PCT No.: PCT/EP2022/063848
§ 371 (c)(1),
(2) Date: Nov. 22, 2023

(87) PCT Pub. No.: WO2022/248384
PCT Pub. Date: Dec. 1, 2022

(65) Prior Publication Data

US 2024/0308905 A1 Sep. 19, 2024

(30) Foreign Application Priority Data

May 25, 2021 (BE) .................................. 2021/5418
May 25, 2021 (DE) ..................... 10 2021 205 298.3

(51) Int. Cl.
*C04B 7/47* (2006.01)
*C04B 7/43* (2006.01)
(Continued)

(52) U.S. Cl.
CPC .................. *C04B 7/47* (2013.01); *C04B 7/43* (2013.01); *F27B 7/2033* (2013.01); *F27B 7/36* (2013.01);
(Continued)

(58) Field of Classification Search
CPC . C04B 7/47; C04B 7/43; F27B 7/2033; F27B 7/36; F27B 7/38; F27D 15/02; F27D 17/18
See application file for complete search history.

(56) References Cited

U.S. PATENT DOCUMENTS

2011/0113988 A1 5/2011 Cordonnier et al.

FOREIGN PATENT DOCUMENTS

CN 101558021 A * 10/2009 ............... C04B 7/45
CN 104583148 A 4/2015
(Continued)

OTHER PUBLICATIONS

DE-19844038-A1 translation (Year: 2026).*
(Continued)

*Primary Examiner* — Michael G Hoang
*Assistant Examiner* — Kurt J Wolford
(74) *Attorney, Agent, or Firm* — thyssenkrupp North America, LLC

(57) ABSTRACT

A process for producing cement clinker (50) including preheating raw material in a preheater, calcining the preheated raw material in a calciner, burning the preheated and precalcined raw meal in a kiln to form cement clinker, wherein the kiln is fed with a combustion gas having an oxygen content of more than 20% by volume, in particular more than 40% by volume, preferably more than 60% by volume, and cooling the cement clinker in a cooler, wherein the cooler has in the conveying direction of the cement clinker a first cooler region and a second cooler region and
(Continued)

wherein the exhaust air from the first cooler region forms the combustion gas, wherein the offgas from the second cooler region is fed to the calciner and has an oxygen content of at most 15% by volume, in particular at most 10% by volume, preferably at most 5% by volume.

10 Claims, 4 Drawing Sheets

(51) Int. Cl.
*F27B 7/20* (2006.01)
*F27B 7/36* (2006.01)
*F27B 7/38* (2006.01)
*F27D 15/02* (2006.01)
*F27D 17/18* (2025.01)

(52) U.S. Cl.
CPC ................ *F27B 7/38* (2013.01); *F27D 15/02* (2013.01); *F27D 17/18* (2025.01)

(56) References Cited

FOREIGN PATENT DOCUMENTS

| | | | | | |
|---|---|---|---|---|---|
| CN | 106164011 | A | | 11/2016 | |
| CN | 112608049 | A | | 4/2021 | |
| DE | 19844038 | A1 | * | 3/2000 | .............. C04B 7/38 |
| DE | 2404 086 | A | | 1/2012 | |
| DE | 10 2014 100 378 | B3 | | 4/2015 | |
| DE | 102018206673 | A1 | | 10/2019 | |
| EP | 2 868 635 | A1 | | 5/2015 | |
| IT | MI 20120383 | A1 | | 9/2013 | |
| JP | S61227952 | A | | 10/1986 | |
| JP | 2007126328 | A | | 5/2007 | |
| JP | 2008239359 | A | | 10/2008 | |
| JP | 2008239393 | A | | 10/2008 | |
| JP | 2011529844 | A | | 12/2011 | |
| WO | 2019211196 | A1 | | 11/2019 | |
| WO | 2019211202 | A1 | | 11/2019 | |

OTHER PUBLICATIONS

CN-101558021-A translation (Year: 2026).*

English Translation of International Search Report issued in PCT/EP2022/063848, dated Jul. 26, 2022.

Oberhauser, Sebastian, "Bewertung und Vergleich von Konzepten der CO2-armen Zementklinkerherstellung auf Basis von CCS Technologien" (Assessment and Comparison of Concepts for Low-CO2 Cement Clinker Production Based on CCS Technologies), Cuvillier Verlag Gottingen, 171 pages, Machine translation attached. (2020).

Von Wedel, Dipl.-Ing. K., Performance of IKN grate coolers, Cement Int'l, vol. 5, 7 pages (2007).

VDZ (Verein Deutscher Zementwerke),Research Institute of the Cement Industry, Activity Report ("Tätigkeitsbericht"), 193 pages, 2012-2015.

CEMCAP CO2 capture from cement production: Optimised operation of an oxyfuel cement plant, 59 pages, actual delivery date Apr. 11, 2018.

CEMCAP CO2 capture from cement production: Assessment of calciner test results Revision 1, 21 pages, starting date of action May 1, 2015.

CEMCAP CO2 capture from cement production: Analysis of oxyfuel clinker cooler operational performance, 90 pages, starting date of action May 1, 2015.

Koring, Kristina, CO-emission reduction potential 2 and technological effects of oxyfuel technology in the cement clinker burning process ("Schriftreihe der Zementindustrie Heft"), Cement Industry Series, Issue 79, 155 pages, 2013.

M. Akternbosche et al., Manufacture of cement clinker ("Forschungszentrum Karlsruhe Technick und Umwelt Wissenschaftliche Berichte"), Karlsruhe Research Center for Technology and Environment Scientific Reports FZKA 6508, Production of cement clinker Process description and analyses for the use of secondary fuels, 58 pages, 2000.

Holderbank Cement Seminar Process Technology, Clinker Coolers, 82 pages, 1995.

Holderbank Cement Seminar 2000, Process Technology II—Kiln Systems, Clinker Coolers, 60 pages, Revision-Feb. 1, 1999.

ZKG Manual Cement Plant Construction 2013/2014 ("ZKG-Handbuch Zementanlagenbau 2013/2014"), 26 pages, 2013.

Dr. Joachim Harder, Latest trends in clinker cooling, ZKG International No. 3, 13 pages, 2011.

Verein Deutscher Zementwerke e. V., Zement-Taschenbuch/Association of German Cement Works e. V. Research Institute of the Cement Industry, Cement Paperback, 51st edition, 2008.

G.Locher, Mathematische Modelle zum Prozess des Brennens von Zementklinker, ZKG International, vol. Jun. 2002, 10 pages, 2002.

European Cement Research Academy, ECRA, Ed. ECRA CCS Project: Reporton Phase IV.A, 2016 Technical Report TR-ECRA-128/2016).

European Cement Research Academy, ECRA, Technical Report AN-2018/0347 False air intrusion: State-of-the-art technologies and advanced sealing measures, 56 pages, Dec. 18, 2018.

Zeman, Frank et al., The Reduced Emission Oxygen Kiln, 77 pages, Jul. 31, 2008.

Armin Möck, Just add water, World Cement, 4 pages, Oct. 2021.

Zeman, Frank, Oxygen combustion in cement production, Energy Procedia 1, pp. 187-194, 2009.

* cited by examiner

METHOD AND DEVICE FOR PRODUCING CEMENT CLINKER

The disclosure relates to a process for producing cement clinker.

It is known from the prior art to introduce oxygen-containing gas for combustion of fuel into the rotary kiln or the calciner of a cement production plant. To reduce the amount of offgas and in order to be able to dispense with complex cleaning processes, it is known for example from DE 10 2018 206 673 A1 to use a combustion gas which is as rich in oxygen as possible, so that the $CO_2$ content in the offgas is high. DE 10 2018 206 673 A1 discloses introducing an oxygen-rich gas into the cooler inlet region to preheat the gas and cool the clinker.

DE 198 44 038 A1 discloses a process for producing white cement.

In such a mode of operation, very high temperatures within the calciner and a high solids loading of the gas, for example in the calciner, arise for example. This leads to material deposits in the calciner and thus, in the worst case, to clogging and damage to the inner wall of the calciner.

Proceeding from this, an object of the present disclosure is to provide a process and a plant for producing cement clinker which overcomes the abovementioned disadvantages and at the same time enables the separation of $CO_2$ from the offgas in a simple manner.

According to a first aspect, a process for producing cement clinker comprises the steps of:

- preheating raw meal in a preheater,
- calcining the preheated raw meal in a calciner,
- burning the preheated and precalcined raw meal in a kiln to form cement clinker, wherein the kiln is fed with a combustion gas having an oxygen content of more than 50% by volume, in particular more than 80% by volume, preferably more than 95% by volume, and
- cooling the cement clinker in a cooler, wherein the cooler has in the conveying direction of the cement clinker a first cooler region and a second cooler region and wherein the exhaust air from the first cooler region forms the combustion gas fed to the kiln.

The offgas from the second cooler region is fed to the calciner and has an oxygen content of at most 15% by volume, in particular at most 10% by volume, preferably at most 5% by volume. The offgas from the second cooler region preferably has a $CO_2$ content of more than 75% by volume. Preferably, the offgas from the second cooler region is completely or partially fed to the calciner, the amount of offgas fed to the calciner preferably being adjustable.

The fluid fed to the second cooler region has an inert fraction of at least 60% by volume, in particular of at least 80% by volume, preferably of at least 90% by volume. The inert fraction of the fluid consists of water, carbon dioxide or water and carbon dioxide. The fluid fed to the second cooler region can include further constituents. For example, a residual oxygen content of 1% to 5% by volume is typical in order to ensure complete combustion. Furthermore, argon, for example, may be present as a further inert gas. Furthermore, nitrogen may also be present as a further inert gas. Nitrogen oxides and/or sulfur oxides may in particular also be present, preferably only in small traces.

Compared to the prior art, which feeds air or nitrogen at this point, the use of a fluid having water and/or carbon dioxide as inert fraction ensures that this gas increases the carrying capacity for the raw material, but does not introduce any additional gases into the system which would be disruptive in a subsequent separation. If the intention is to separate off the carbon dioxide at the end, this is easier the purer the preheater offgas is, in particular the less nitrogen it contains. Avoiding nitrogen as a carrier gas for the process thus results in easier separability of $CO_2$ in the overall process.

The offgas from the second cooler region preferably serves as a carrier gas in the calciner and ensures an increase in the amount of gas within the calciner and/or the preheater. This prevents the calciner from overheating and reduces the solids loading in the calciner gas, so that deposits of material within the calciner are avoided.

The combustion gas fed to the kiln has, for example, an oxygen content of more than 50% by volume, in particular more than 80% by volume, preferably more than 95% by volume. The combustion gas consists, for example, entirely of pure oxygen, with the oxygen content of the combustion gas being 100% by volume.

The oxygen content and the $CO_2$ content are preferably a percentage by volume, in particular based on the dry gas.

The kiln is preferably a rotary kiln having a rotary tube that is rotatable about its longitudinal axis and is preferably slightly inclined in the conveying direction of the material to be burned, so that the material is moved in the conveying direction as a result of the rotation of the rotary tube and gravity. The kiln preferably has at one of its ends a material inlet for admitting preheated and precalcined raw meal and at its end opposite the material inlet a material outlet for discharging the burned clinker into the cooler. The kiln head is preferably arranged at the material outlet end of the kiln and includes the burner for burning the material and preferably a fuel inlet for admitting fuel into the kiln, preferably to the burner. The kiln preferably has a sintering zone in which the material is at least partially melted and in particular has a temperature of 1500° C. to 1800° C., preferably 1450° C. to 1700° C.

The cooler for cooling the cement clinker preferably adjoins the material outlet of the kiln. Within the cooler, the cement clinker to be cooled is preferably transported via a conveyor device in the conveying direction towards the outlet of the cooler. In the conveying direction, the cooler preferably has at least two, preferably three cooler regions. The first cooler region, upstream in the conveying direction, in particular directly adjoins the kiln and is preferably arranged in such a way that the cement clinker burned in the kiln falls from the material outlet of the kiln, preferably due to gravity, into the first cooler region. The first cooler region for example has a static or dynamic grate. Preferably, a first and a second cooling gas is fed to the cooler. In particular, the first cooling gas is fed to the first cooler region. The first cooler region in particular has a cooling gas inlet beneath the static or dynamic grate, through which the first cooling gas is introduced and flows from below through the static or dynamic grate and the cement clinker to be cooled lying thereupon. The first cooler region preferably has an offgas outlet for discharging the first cooling gas, the offgas outlet being connected to the kiln, in particular the kiln head, so that the offgas is conducted to the kiln and preferably completely forms the combustion gas of the kiln.

In particular, the second cooling gas is fed to the second cooler region. The second cooler region preferably has a dynamic grate for the transport of the cement clinker to be cooled, with in particular a cooling gas inlet being arranged beneath the dynamic grate, through which the second cooling gas is introduced and flows from below through the dynamic grate and the cement clinker to be cooled lying thereupon. The second cooler region preferably has an offgas outlet for discharging the second cooling gas. The second cooler region preferably adjoins the first cooler region directly in the conveying direction of the cement clinker and is in particular separated from the first cooling region in terms of gas, so that the first cooling gas flows exclusively through the first cooler region and does not pass into the second cooling region. The second cooling gas preferably flows exclusively through the second cooler region and does not pass into the first cooling region. For separation of the first and the second cooler region in terms of gas, the cooler preferably has a separating means, such as a flap, a curtain or a gas divider. The separating means is, for example, a pressure difference between the first and the second cooler region, by means of which a separation of the cooling gases within the cooler region is achieved.

The cooler is preferably additionally fed with a third cooling gas, which is introduced into a third cooler region. The third cooler region preferably has a dynamic grate for the transport of the cement clinker to be cooled, with in particular a cooling gas inlet being arranged beneath the dynamic grate, through which the third cooling gas is introduced and flows from below through the dynamic grate and the cement clinker to be cooled lying thereupon. The third cooler region preferably has an offgas outlet for discharging the third cooling gas as cooler exhaust air. The third cooler region preferably adjoins the second cooler region directly in the conveying direction of the cement clinker and is in particular separated from the second cooling region in terms of gas, so that the second cooling gas flows exclusively through the second cooler region and does not pass into the third cooling region. The third cooling gas preferably flows exclusively through the third cooler region and does not pass into the first or second cooling region. For separation of the second and the third cooler region in terms of gas, the cooler preferably has a further separating means, such as a flap, a curtain or a gas divider.

The process described above results in a lower $CO_2$ partial pressure in the kiln, as a result of which residual calcination of the incompletely calcined material is effected, with only a small amount of heat energy having to be expended for this residual calcination. Due to the increased $CO_2$ partial pressure, the $CO_2$ concentration based on the moist offgas is preferably less than 40% by volume, and the effort for cleaning so-called deposits is reduced. Deposits are understood to be solid phases that are generally mineral phases and are formed to a great degree starting from temperatures above 850° C. The mineral phases may for example be spurrite or belite phases. In order to keep the cleaning effort within appropriate bounds, the degree of precalcination can be reduced by operating the calciner with degrees of precalcination of less than 90% by volume or at lower temperatures. Residual calcination is effected faster at identical temperatures with the process described above in the kiln due to the lower $CO_2$ partial pressure, and the calcination of the raw material may also proceed spontaneously, for example.

According to a first embodiment, a cooling gas is in each case fed separately to the first and to the second cooler region, wherein the cooling gas fed to the second cooler region has an oxygen content of at most 15% by volume, in particular 10% by volume, preferably 5% by volume. The second cooling gas fed to the second cooler region preferably has a $CO_2$ content of at least 75% by volume, in particular at least 80% by volume, preferably at least 90% by volume. Oxygen is preferably fed to the second cooling gas and/or to the offgas from the second cooler region, so that the oxygen content of the offgas prior to entering the calciner is at most 15% by volume, in particular 10% by volume, preferably 5% by volume.

According to a further embodiment, the oxygen concentration of the calciner offgas is determined downstream of the calciner and the oxygen concentration of the offgas from the second cooler region that is fed to the calciner is regulated depending on the oxygen concentration determined.

Preferably, the oxygen content of the calciner offgas is determined by means of a measuring device and the amount of offgas and/or the oxygen content of the offgas from the second cooler region is regulated, in particular increased or reduced, depending on the oxygen content determined. In particular, the volume flow of the offgas from the second cooler region is kept constant. The determined oxygen content is preferably compared with a predetermined limit value and in the event of a deviation from this limit value, the amount of offgas from the second cooler region that is fed to the calciner and/or the oxygen content of the offgas is increased or reduced. If the limit value of the oxygen content is exceeded, the amount of offgas from the second cooler region that is fed to the calciner and/or the oxygen content of the offgas is preferably reduced. If the limit value of the oxygen content is undershot, the amount of offgas from the second cooler region that is fed to the calciner and/or the oxygen content of the offgas is preferably increased.

The offgas from the second cooler region is fed to the calciner and for example partially forms the combustion gas of the calciner. The offgas from the kiln also at least partially or completely forms the combustion gas of the calciner. A predetermined amount of oxygen is preferably fed to the kiln and the calciner, with the respective proportions of oxygen to the kiln and the calciner preferably being adjustable. The oxygen content of the combustion air fed to the kiln is preferably adjusted depending on the oxygen content of the offgas from the second cooling region that is fed to the calciner. A high oxygen concentration in the combustion gas to the kiln, particularly in the sintering zone of the kiln, enables improved combustion kinetics, simplifying the processing of the fuels. Furthermore, the complexity and operating costs of the kiln burners are reduced.

A grinding process optionally connected upstream is also simplified or entails lower operating costs. It is also conceivable for a high proportion of substitute fuels to be used. A high oxygen concentration within the kiln ensures a high sintering zone temperature, producing clinker having a higher alite content, which enables the clinker content in the cement to be reduced. For example, the clinker is replaced by less $CO_2$-intensive materials such as limestone, fly ash, calcined clays or the like, resulting in a lower $CO_2$ emission of the cement and subsequent products for the same strength values. A high sintering zone temperature also enables a reduction in the residence time of the solid in the kiln, as the formation of the clinker phase occurs more quickly. This makes it possible to operate the kiln with a higher clinker throughput.

According to a further embodiment, at least a portion of the offgas from the second cooler region is fed to the preheater. The amount of offgas from the second cooler region to the calciner and the preheater is preferably adjustable. In particular, a metering element, such as a valve or a flap, is arranged in a conduit between the second cooler region and the preheater or calciner. Conducting the offgas at least partially to the preheater enables optimal adjustment of the combustion conditions in the calciner.

According to a further embodiment, the offgas from the preheater is fed to a conditioning device. The conditioning device is for example a filter, heat exchanger, gas mixer, condenser or spray tower. Preferably, the conditioning device is arranged downstream of the preheater in the flow direction of the gas and is in particular connected to the second or third cooler region, so that the offgas from the conditioning device forms the first or second cooling gas. The gas is preferably dehumidified and/or cleaned in the conditioning device.

According to a further embodiment, following the conditioning device the gas is fed to the second cooler region. Preferably, the offgas from the preheater that is treated by means of the conditioning device at least partially or completely forms the second cooling gas.

According to a further embodiment, following the conditioning device the gas is fed to the third cooler region. Preferably, the offgas from the preheater that is treated by means of the conditioning device at least partially or completely forms the third cooling gas.

According to a further embodiment, the offgas from the third cooler region is fed to the second cooler region. Water is preferably fed to the third cooler region, whereby the water content of the offgas from the third cooler region is preferably adjusted. Prior to entering the second cooler region, the offgas from the third cooling region is preferably dedusted and/or cooled.

According to a further embodiment, water is fed to the second cooler region. The water is preferably fed to the second cooler region via a humidification device. The humidification device preferably comprises a plurality of spray nozzles for injecting water into the second cooler region. In particular, the water is introduced into the second cooler region separately from the second cooling gas. Preferably, a water content of more than 10% by volume, in particular more than 20% by volume, preferably more than 30% by volume, is set in the second cooler region by means of the humidification device. As a result, a corresponding moisture content is also set in the calciner. This brings about a reduced $CO_2$ partial pressure in the calciner. The water in the offgas, especially the preheater offgas, can easily be condensed out, which increases the $CO_2$ partial pressure in the offgas, as a result of which a subsequent separation of $CO_2$ is simplified.

Preferably, the temperature and/or the volume flow of the offgas from the second cooler region is determined by means of a measuring device and the amount of water introduced into the second cooler region via the humidification device is regulated, in particular increased or reduced, depending on the temperature and/or volume flow determined. In particular, the volume flow of the offgas is kept constant. The determined volume flow and/or the determined temperature are preferably compared with a respective predetermined limit value and in the event of a deviation from this limit value the amount of water into the second cooler region is increased or reduced. If the limit value of the volume flow and/or the temperature is exceeded, the amount of water into the second cooler region is preferably increased. If the limit value of the volume flow and/or the temperature is undershot, the amount of water into the second cooler region is preferably reduced.

According to a further embodiment, the cooling gas fed to the second cooler region has a water content of more than 10% by volume, in particular more than 20% by volume, preferably more than 30% by volume. Preferably, the offgas from the second cooler region has a water content of more than 10% by volume, in particular more than 20% by volume, preferably more than 30% by volume.

According to a further embodiment, the fluid fed to the second cooler region is taken from the preheater offgas. This achieves a circulation of the carrier gas, as a result of which no additional gases, in particular no additional nitrogen, are fed which then have to be laboriously separated off again.

According to a further embodiment, the gas stream of the preheater offgas is divided and a substream of the preheater offgas is fed to the second cooler region.

According to a further embodiment, the gas stream of the preheater offgas is dehumidified and at least a portion of the water separated off in liquid form is fed to the second cooler region. This feeding is particularly preferably effected by spraying, so that the heat of evaporation is also used for cooling the product.

According to a further embodiment, the gas stream of the preheater offgas is divided and a substream of the preheater offgas is fed to the second cooler region. The gas stream of the preheater offgas is additionally dehumidified and at least a portion of the water separated off in liquid form is fed to the second cooler region.

The disclosure also encompasses a cement production plant having

- a preheater for preheating raw meal,
- a calciner for calcining the preheated raw meal,
- a kiln for burning the raw meal to form cement clinker, and
- a cooler for cooling the cement clinker, wherein the cooler has in the conveying direction of the clinker a first cooler region and a second cooler region and wherein the first cooler region is connected in terms of gas to the kiln so that the offgas from the first cooler region can be fed to the kiln as combustion gas.

The second cooler region is connected in terms of gas to the calciner, so that the offgas from the second cooler region can be fed to the calciner and optionally additionally to the preheater.

The second cooler region is connected to the preheater offgas 30 in such a way that a portion of the preheater offgas stream is conducted into the second cooler region. Compared to the prior art, which feeds air or nitrogen at this point, the use of preheater offgas ensures that this circulated gas increases the carrying capacity for the raw material, but does not introduce any additional gases into the system. If the intention is to separate off the carbon dioxide at the end, this is easier the purer the preheater offgas is, in particular the less nitrogen it contains. Avoiding nitrogen as a carrier gas for the process thus results in easier separability of $CO_2$ in the overall process.

The advantages and configurations described with reference to the process for producing cement clinker also apply to the cement production plant in a corresponding manner in terms of apparatus.

Preferably, the second cooler region is connected to the calciner via a conduit for conducting gases, which extends in particular from a cooling gas outlet of the second cooler region to a gas inlet of the calciner. The second cooler region is optionally connected to the preheater via a conduit for conducting gases. The calciner preferably has a riser conduit through which the offgas from the kiln and the raw material to be calcined flows at least partially in cocurrent. Furthermore, the calciner preferably has a combustion chamber or a burner connected to the riser conduit for combusting fuel within the calciner.

According to one embodiment, a conditioning device for treating the offgas from the preheater is arranged downstream of the preheater in the gas flow direction.

According to a further embodiment, the cooler has a third cooler region which adjoins the second cooling region and wherein the conditioning device is connected in terms of gas to the second or the third cooler region.

According to a further embodiment, the third cooler region is connected to the second cooler region for recycling the offgas from the third cooler region into the second cooler region.

According to a further embodiment, the cooler has a humidification device for humidifying the cooling gas within the cooler.

According to a further embodiment, the second cooler region is directly connected to the preheater offgas in a gas-conducting manner. As a result, a substream of the preheater offgas can be guided directly into the second cooler region.

According to a further embodiment, the preheater offgas is guided through a dehumidifier. The dehumidifier is connected to the second cooler region in a liquid-conducting manner. In particular, the liquid water separated off in the dehumidifier is introduced into the second cooler region by a spraying device.

BRIEF DESCRIPTION OF THE DRAWINGS

The disclosure is described in more detail below on the basis of multiple exemplary embodiments with reference to the appended figures.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
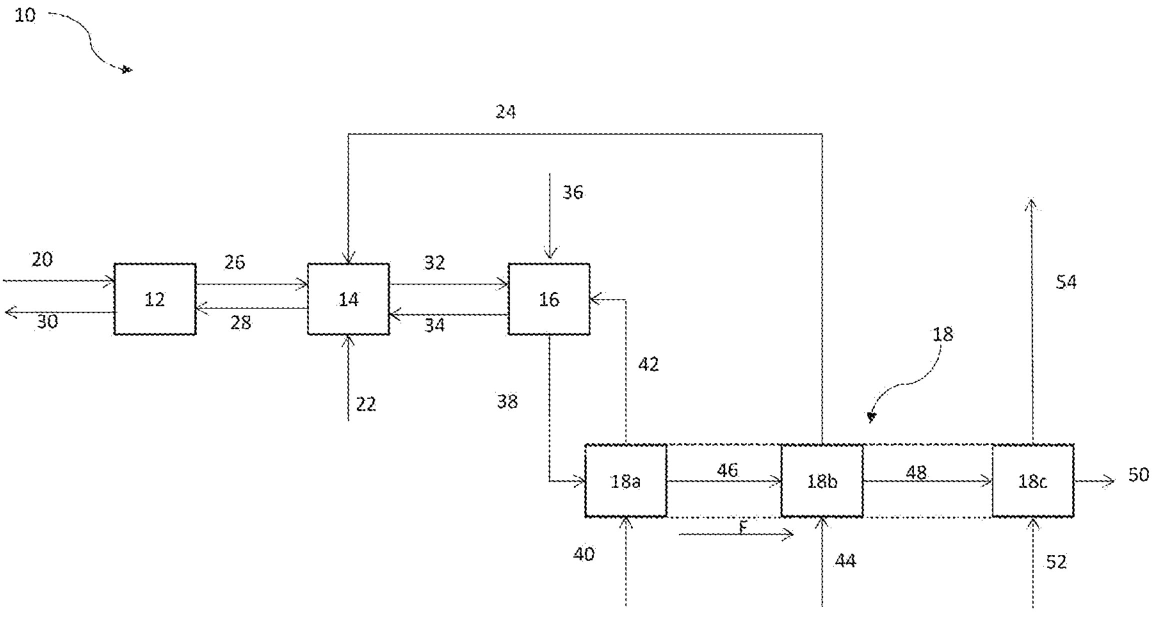
FIG. 1 shows a schematic illustration of a cement production plant in a flow diagram according to one embodiment.

FIG. 1 shows a cement production plant 10 with a for example single-string preheater 12 for preheating raw meal, a calciner 14 for calcining the raw meal, a kiln 16, in particular a rotary kiln, for burning the raw meal to form clinker and a cooler 18 for cooling the clinker burned in the kiln 16.

The preheater 12 preferably comprises a plurality of cyclones for separating the raw meal from the raw meal gas stream. For example, the preheater 12 has five cyclones, which are arranged one below the other in four cyclone stages. The preheater 12 in particular has a material inlet for admitting raw material 20, in particular raw meal, preferably into the uppermost cyclone stage of the preheater 12. The raw material 20 flows successively through the cyclones of the cyclone stages of the preheater 12 in countercurrent to the kiln and/or calciner offgas and is thereby heated to give hot meal 26. For example, the calciner 14 is arranged between the last and the penultimate cyclone stage. The calciner 14 preferably has a riser with at least one combustion site for heating of the raw meal 26 heated in the preheater, such that the raw meal is calcined in the calciner 14. In addition, the calciner 14 has a fuel inlet for introducing fuel 22 into the riser of the calciner 14. The calciner 14 preferably also has a gas inlet for admitting a gas, in particular carrier gas 24, into the riser of the calciner 14. The calciner offgas 28 is introduced into the preheater 12, preferably into the penultimate cyclone stage, and leaves the preheater 12 downstream of the uppermost cyclone stage as preheater offgas 30.

Connected downstream of the preheater 12 and the calciner 14 in the flow direction of the raw meal is the kiln 16, such that the raw material 32 preheated in the preheater 12 and calcined in the calciner 14 flows into the kiln 16. The material inlet of the kiln 16 is preferably connected directly to the riser of the calciner 14, such that the kiln offgas 34 flows into the calciner 14 and subsequently into the preheater 12. The kiln 16 is, by way of example, a rotary kiln having a rotary tube that is rotatable about its longitudinal axis, arranged at a slightly declining angle. At the material outlet end within the rotary tube, the kiln 16 preferably has a burner and an associated fuel inlet for admitting fuel 36 into the kiln 16. The material outlet of the kiln 16 is arranged at the end of the rotary tube opposite the material inlet, so that the raw material 32 to be burned is conveyed within the rotary tube by the rotation of the rotary tube in the direction of the burner and the material outlet. The raw material 32 is burned within the kiln 16 to form cement clinker 38. Preferably, the temperature within the kiln 16, particularly in the sintering zone of the kiln 16, is approximately 1450° C. to 1800° C., preferably 1500° C. to 1700° C.

The cooler 18 for cooling the clinker adjoins the material outlet of the kiln 16. The clinker is conveyed through the cooler 18 in the conveying direction F. The cooler 18 has in the conveying direction F of the clinker 38 to be cooled a first cooler region **18*a* and a second cooler region 18*b* which adjoins the first cooler region 36 in the conveying direction F. Furthermore, the cooler 18 has a third cooler region 18*c*, which adjoins the second cooler region 18*b* in the conveying direction F. The kiln 16 is connected to the cooler 18 via the material outlet of the kiln 16, so that the clinker 38 burned in the kiln 16 falls into the cooler 18**.

The first cooler region **18*a* is preferably arranged beneath the material outlet of the kiln 16 so that the cement clinker 38 falls from the kiln 16 into the first cooler region 18*a*. The first cooler region 18*a* constitutes an intake region of the cooler 18 and preferably has a static grate which receives the clinker 38 exiting the kiln 16. The static grate is in particular arranged entirely within the first cooler region 18*a* of the cooler 18. Preferably, the clinker 38 falls out of the kiln 16 directly onto the static grate. The static grate 40 preferably extends in such a way that the clinker slides along the static grate in the conveying direction F. The first cooler region 18***a* has, for example, in addition to the static grate or exclusively, a dynamic grate for conveying the clinker in the conveying direction F through the cooler 18.

The first cooler region 18*a* is adjoined by the second cooler region 18*b* of the cooler 18, to which the hot clinker 46 cooled in the first cooler region 18*a* is fed. In the first cooler region 18*a* of the cooler 18, the clinker is cooled in particular to a temperature of less than 1100° C., the cooling being effected in such a way that the liquid phases present in the clinker are completely solidified into solid phases. When leaving the first cooler region 18*a* of the cooler 18, the hot clinker 46 is preferably present entirely in the solid phase and at a temperature of at most 1100° C., in particular at most 1000° C. In the second cooler region 18*b* of the cooler 18, the hot clinker 48 is cooled further, preferably to a temperature of less than 700° C. In the third cooler region 18*c*, the clinker is cooled in particular to a temperature of approximately 100° C. or less and leaves the cooler 18 as cold clinker 50. Preferably, the second cooling gas stream can be divided into multiple gas substreams that have different temperatures.

The static or dynamic grate of the first cooler region 18*a* for example has passages through which a first cooling gas 40 enters the first cooler region 18*a*. The first cooling gas 40 preferably flows from below through the static or dynamic grate into the first cooler region 18*a*. The first cooling gas stream 40 is for example pure oxygen or a gas with a nitrogen content of 15% by volume or less and an oxygen content of 50% by volume or more. The first cooling gas 40 flows through the clinker and then flows into the kiln 16. The first cooling gas 40, in particular the offgas from the first cooler region 18*a*, for example partially or completely forms the combustion gas 42 of the kiln 16. The high proportion of oxygen in the combustion gas 42 results in a preheater offgas 30 which consists essentially of $CO_2$ and water vapor, and has the advantage that complex downstream cleaning processes for offgas cleaning can be dispensed with. Furthermore, the amounts of process gas are reduced, with the result that the plant may be given considerably smaller dimensions.

The first and the second cooler region 18*a* and 18*b* are preferably separated from each other in terms of gas via a separating means, so that the first cooling gas 40 flows exclusively into the first cooler region 18*a* and leaves it as offgas 42, in particular combustion gas 42 for the kiln 16. The first cooling gas 40 preferably does not pass into the second or third cooler region 18*b*, 18*c*. The second cooling gas 44 preferably flows exclusively into the second cooler region 18*b* and leaves it as offgas 24, in particular combustion gas 24 for the calciner 14. The third cooling gas 52 preferably flows exclusively into the third cooler region 18*c* and leaves it as cooler exhaust air 54. It is optionally conceivable that the first and the second cooler region 18*a*, 18*b* are not separated from each other in terms of gas, meaning that the cooling gases 40 and 44 flow both into the first and into the second cooling region 18*a*, 18*b*.

Preferably fitted between the first and the second cooler region 18*a*, 18*c* and optionally between the second and the third cooler region 18*b* and 18*c* is a separating means for separation of the cooler regions in terms of gas. The separating means is, for example, a mechanical separating means, such as a flap or a curtain. The separating means may also comprise a gas divider in which a separating gas, such as $CO_2$, is fed between the cooler sections 18*a-c*. The separating means may also be a pressure difference that is set between the first and the second cooler region. Such a pressure difference brings about a controlled separation of the gases of the cooling regions.

Within the cooler 18, the clinker to be cooled is moved in the conveying direction F. The second cooler region 18*b* preferably has a dynamic, in particular movable, grate, which adjoins the first cooler region 18*b* in the conveying direction F. A dynamic grate in particular has a conveying unit that transports the clinker in the conveying direction F. The conveying unit is for example a sliding-floor conveyor, which has a plurality of conveying elements for transporting the bulk material. In the case of a sliding-floor conveyor, the conveying elements are a plurality of planks, preferably grate planks, which form an aeration floor. The conveying elements are arranged next to one another and can be moved in the conveying direction F and counter to the conveying direction F. Cooling gas can flow through the conveying elements in the form of conveying planks or grate planks, which are arranged over the entire length of the second cooler region 18*b* of the cooler 18 and form the surface on which the clinker rests. The conveying unit may also be a pusher conveyor, with the conveying unit comprising a stationary aeration floor through which a cooling gas stream can flow, and a plurality of conveying elements which can be moved relative to the aeration floor. The conveying elements of the pusher conveyor are preferably arranged above the aeration floor and have entrainment elements running transversely to the conveying direction. To transport the clinker along the aeration floor, the conveying elements can be moved in the conveying direction F and counter to the conveying direction F. The conveying elements of the pusher conveyor and of the sliding-floor conveyor can be movable in accordance with the "walking floor principle", wherein the conveying elements are all moved simultaneously in the conveying direction and non-simultaneously counter to the conveying direction. As an alternative to this, other conveying principles used in bulk material technology are also conceivable.

A plurality of fans are optionally arranged beneath the dynamic grate, by means of which the second cooling gas 44 is blown through the dynamic grate from below. The second cooling gas 44 is preferably an oxygen-poor gas with an oxygen content of at most 15% by volume, in particular at most 10% by volume, preferably at most 5% by volume. The oxygen content is in particular the oxygen in % by volume based on the dry gas. In particular, the second cooling gas 44 comprises a mixture of $CO_2$ and water. The offgas 24 of the second cooler region 18*b* is preferably fed completely or partially to the calciner 14 and preferably forms a carrier gas within the calciner 14. The carrier gas 24 introduced into the calciner 14 preferably has an oxygen content of at most 15% by volume, in particular at most 10% by volume, preferably at most 5% by volume. In order to achieve such an oxygen content, the cooling gas preferably has such an oxygen content or the offgas 24 from the second cooler region 18*b* prior to entering the calciner is subjected to oxygen enrichment in order to establish an oxygen content of at most 15% by volume in the offgas 24. The carrier gas 24, in particular the offgas from the second cooler region 18*b*, preferably has a $CO_2$ content of at least 75% by volume based on the dry gas. The carrier gas 24 ensures improved solids transport within the calciner 14, with the amount of gas within the calciner 14 being increased. The low oxygen content and high $CO_2$ content in the carrier gas enables simple separation of the $CO_2$ in the preheater offgas 30, for example using a cryogenic process.

The amount of carrier gas 24 that is conducted into the calciner 14 is preferably adjustable. In particular, the amount of carrier gas 24 and/or the oxygen content of the carrier gas 24 is regulated. Preferably, the oxygen content of the calciner offgas 28 is determined by means of a measuring device and the amount of carrier gas and/or the oxygen content of the carrier gas 24 is regulated, in particular increased or reduced, depending on the oxygen content determined. In particular, the volume flow of the offgas 24 is kept constant. The determined oxygen content is preferably compared with a predetermined limit value and in the event of a deviation from this limit value, the amount of carrier gas 24 and/or the oxygen content of the carrier gas 24 is increased or reduced. If the limit value of the oxygen content is exceeded, the amount of carrier gas 24 and/or the oxygen content of the carrier gas 24 is preferably reduced. If the limit value of the oxygen content is undershot, the amount of carrier gas 24 and/or the oxygen content of the carrier gas 24 is preferably increased.

The second cooler region 18*b* is adjoined by way of example by the third cooler region 18*c*, which for example has a dynamic grate, as described above, for transporting the hot clinker 48 in the conveying direction F. A third cooling gas 52 is preferably fed to the third cooler region 18*c* and, after cooling the hot clinker 48 in the third cooler region 18*c*, is discharged therefrom as cooler exhaust air 52 out of the cooler 18. The third cooling gas 52 is air, for example.

Figure 2:
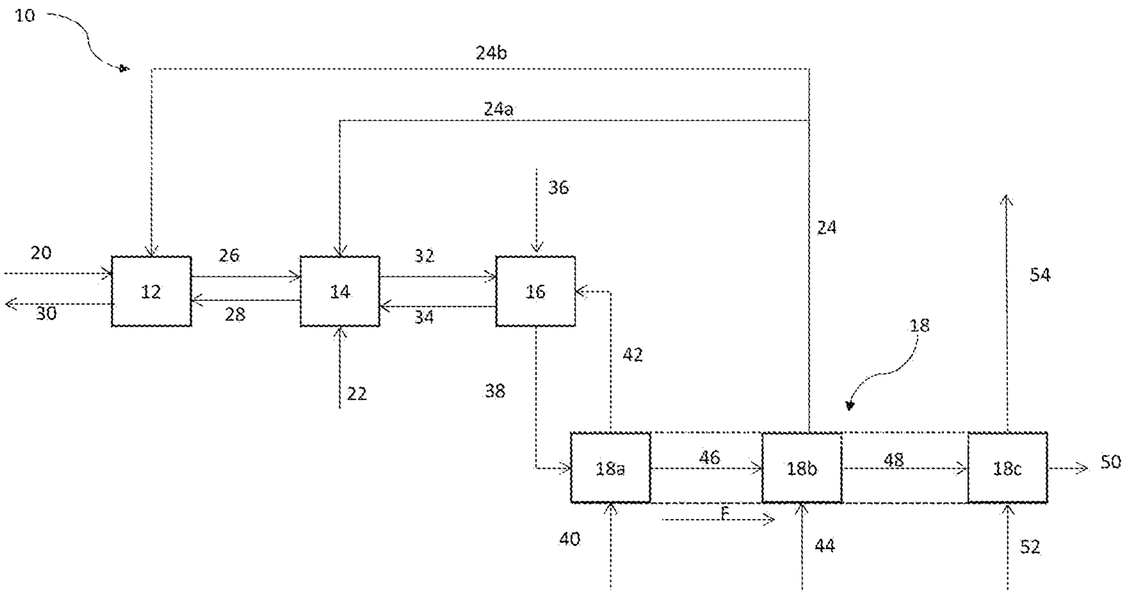
FIG. 2 shows a schematic illustration of a cement production plant in a flow diagram according to a further embodiment.

FIG. 2 shows a cement production plant 10, which essentially corresponds to the cement production plant 10 illustrated in FIG. 1. Identical elements are provided with identical reference signs. In contrast to FIG. 1, in the cement production plant of FIG. 2 the offgas 24 from the second cooler region is separated into two gas substreams, with a first gas substream 24*a* being conducted to the calciner 14 as carrier gas and a second gas substream 24*b* being conducted to the preheater 12. The amount of the gas substreams based on the offgas 24 can preferably be adjusted. As a result, the amount of gas to the calciner 14 and the preheater 12 can be adjusted, such that optimal fuel consumption in the calciner 14 can be achieved.

Figure 3:
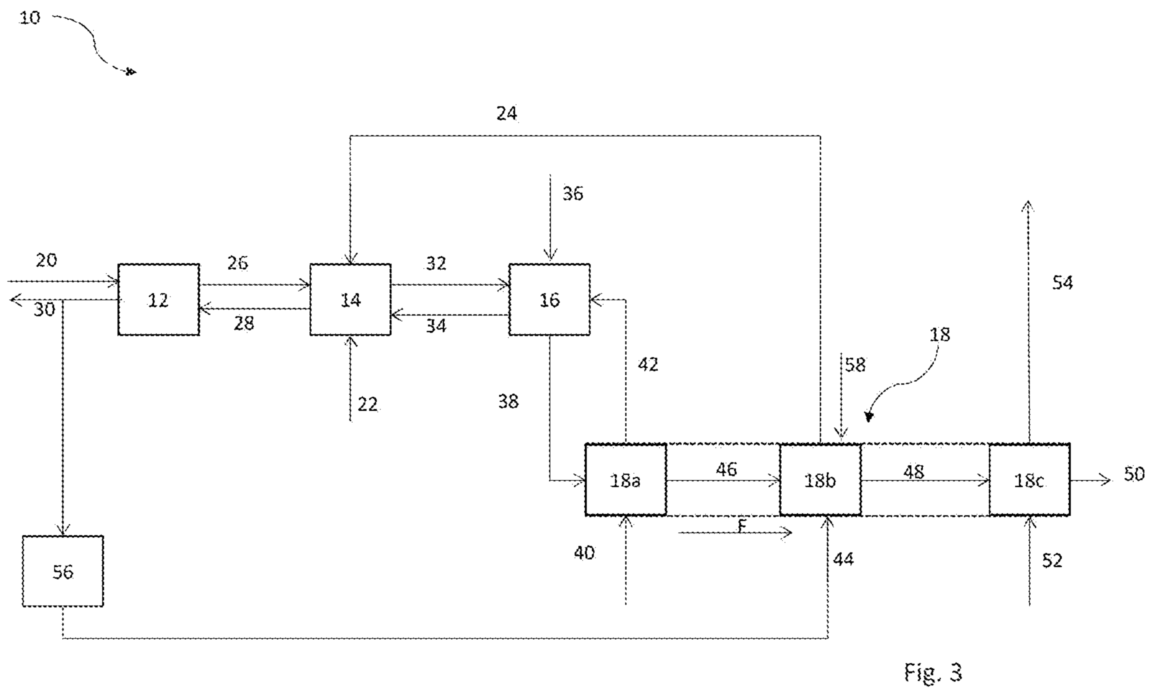
FIG. 3 shows a schematic illustration of a cement production plant in a flow diagram according to one embodiment.

FIG. 3 shows a cement production plant 10, which essentially corresponds to the cement production plant 10 illustrated in FIG. 1. Identical elements are provided with identical reference signs. In contrast to FIG. 1, the cement production plant 10 has a conditioning device 56, with the preheater offgas 30 being fed at least partially to the conditioning device 56. The conditioning device 56 is for example a filter, heat exchanger, gas mixer, condenser or spray tower. The conditioning device 56 is preferably configured such that it treats the preheater offgas, in particular cools it, filters dust or coarser particles from the preheater gas and/or increases or reduces the water content of the preheater offgas. The conditioning device 56 is preferably configured such that it treats the preheater offgas such that, on leaving the conditioning device 56, it has an oxygen content of at most 15% by volume, in particular at most 10% by volume, preferably at most 5% by volume, and preferably comprises a mixture of $CO_2$ and water, in particular with a $CO_2$ content of preferably at least 75% by volume. The preheater offgas treated in the conditioning device 56 preferably completely or partially forms the second cooling gas 44 and is introduced into the second cooler region 18*b*.

In contrast to the cement production plant of FIG. 1, the cement production plant 10 of FIG. 3 has a humidification device 58 which is configured and arranged for the introduction, in particular injection, of water into the second cooler region 18*b*.

Preferably, a water content of more than 10% by volume, in particular more than 20% by volume, preferably more than 30% by volume, is set in the second cooler region 18*b* by means of the humidification device 58. As a result, a corresponding moisture content is also set in the calciner 14. The calciner offgas 28 and the preheater offgas 30 preferably have a corresponding moisture content. This brings about an increased $CO_2$ partial pressure in the offgas, in particular the preheater offgas 30, preferably after the condensation of the moisture present in the offgas, for example in a condenser or gas scrubber, which makes possible a subsequent separation of $CO_2$ with a lower electrical energy expenditure.

Preferably, the temperature and/or the volume flow of the offgas 24 from the second cooler region 18*b* is determined by means of a measuring device and the amount of water introduced into the second cooler region 18*b* via the humidification device 58 is regulated, in particular increased or reduced, depending on the temperature and/or volume flow determined. In particular, the volume flow of the offgas 24 is kept constant.

The determined volume flow and/or the determined temperature are preferably compared with a respective predetermined limit value and in the event of a deviation from this limit value the amount of water into the second cooler region 18*b* is increased or reduced. If the limit value of the volume flow and/or the temperature is exceeded, the amount of water into the second cooler region 18*b* is preferably increased.

Preferably, a substream of the preheater offgas 30 is fed to the conditioning device 56, with the remaining substream of the preheater offgas 30 being discharged. It is also conceivable for the preheater offgas 30 to be fed completely to the conditioning device 56 and, following the conditioning device 56, for only a substream to form the second cooling gas 44 and the remaining substream to be discharged from the cement production plant 10.

Figure 4:
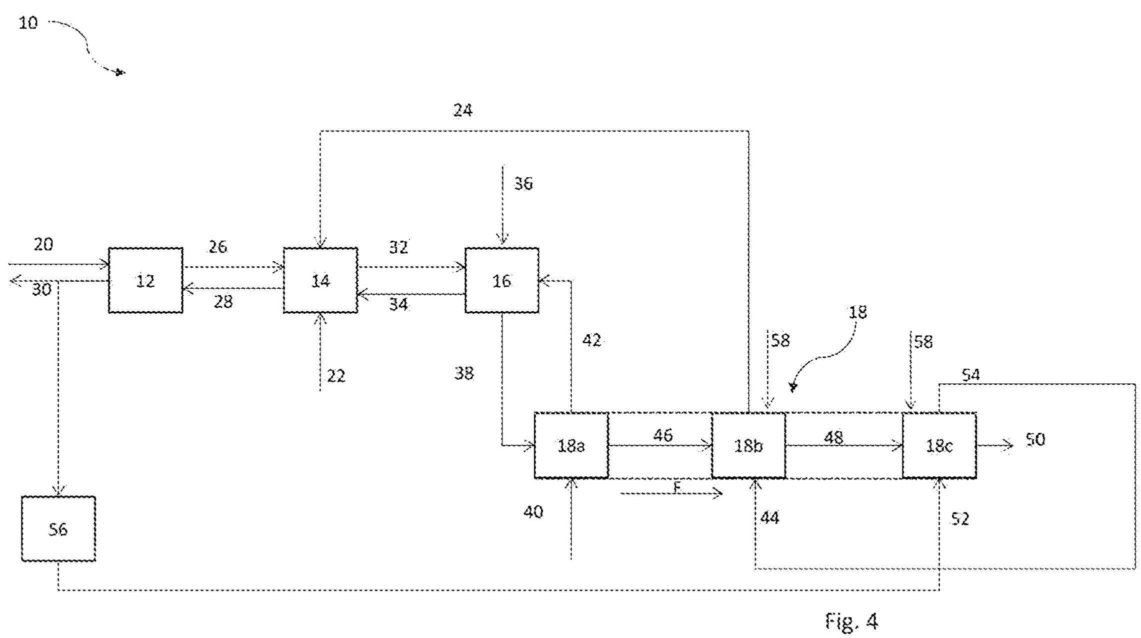
FIG. 4 shows a schematic illustration of a cement production plant in a flow diagram according to a further embodiment.

FIG. 4 shows a cement production plant 10, which essentially corresponds to the cement production plant 10 illustrated in FIG. 3. Identical elements are provided with identical reference signs. In contrast to FIG. 3, in the exemplary embodiment of FIG. 4 the preheater offgas 30 treated by means of the conditioning device 56 is fed to the third cooler region 18*c* and partially or completely forms the third cooling gas 52. The offgas 54 from the third cooler region 18*c* is preferably completely or partially fed to the second cooler region 18*b* and forms the second cooling gas 44. The third cooler region 18*c* by way of example has a further humidification device 58, which is configured to introduce water into the third cooler region 18*c*.

Preferably arranged between the second cooler region 18*b* and the third cooler region 18*c* is a further conditioning device which is not illustrated in FIG. 4 and which is configured such that it treats the offgas from the third cooler region 18*c* such that, on leaving the conditioning device 56, it has an oxygen content of at most 15% by volume, in particular at most 10% by volume, preferably at most 5% by volume, and preferably comprises a mixture of $CO_2$ and water, in particular with a $CO_2$ content of preferably at least 75% by volume. The preheater offgas treated in the further conditioning device preferably completely or partially forms the second cooling gas 44 and is introduced into the second cooler region 18*b*. This makes it possible to reduce the amount of offgas from the cooler 18.

The exemplary embodiment differs from the exemplary embodiment shown in FIG. 3 by an additional dehumidifier 60, which dehumidifies the preheater offgas 30, for example prior to carbon dioxide separation. The water separated off in the dehumidifier 60 is fed via the fluid stream 62 to the second cooler region 18*b* and is in particular sprayed into the latter.

LIST OF REFERENCE SIGNS

10 cement production plant
12 preheater
14 calciner
16 kiln
18 cooler
18*a* first cooler region
18*b* second cooler region
18*c* third cooler region
20 raw material
22 fuel
24 offgas from the second cooler region/carrier gas to the calciner
26 hot meal/heated raw material
28 calciner offgas
30 preheater offgas
32 calcined raw material
34 kiln offgas
36 fuel
38 hot cement clinker
40 first cooling gas
42 offgas from the first cooler region/combustion gas to the kiln
44 second cooling gas
46 hot clinker
48 hot clinker
50 cold clinker
52 third cooling gas
54 cooler exhaust air
56 conditioning device
58 humidification device
60 dehumidifier
62 fluid stream
F conveying direction of the clinker within the cooler 18

The invention claimed is:

1. A method for producing cement clinker comprising:

preheating raw material in a preheater;

calcining the preheated raw material in a calciner;

burning the preheated and calcined raw meal in a kiln to form cement clinker, wherein the kiln is fed with a combustion gas having an oxygen content of more than 50% by volume; and cooling the cement clinker in a cooler, wherein the cooler has in a conveying direction of the cement clinker a first cooler region and a second cooler region and wherein exhaust air from the first cooler region forms the combustion gas, wherein offgas from the second cooler region is fed to the calciner and has an oxygen content of at most 15% by volume, wherein a fluid fed to the second cooler region has an inert fraction of at least 60% by volume, and wherein the inert fraction of the fluid consists of water, carbon dioxide or water and carbon dioxide.

2. The method of claim 1, wherein a cooling gas is fed separately to the first and to the second cooler regions, and wherein the cooling gas fed to the second cooler region has an oxygen content of at most 15% by volume.

3. The method of claim 1, wherein the oxygen concentration of the gas is determined downstream of the calciner and the oxygen concentration of the offgas from the second cooler region that is fed to the calciner is regulated depending on the oxygen concentration determined.

4. The method of claim 1, wherein at least a portion of the offgas from the second cooler region is fed to the preheater.

5. The method of claim 1, wherein a preheater offgas is fed to a conditioning device for treatment.

6. The method of claim 5, wherein following the conditioning device the gas is fed to the second cooler region.

7. The method of claim 5, wherein the cooler includes a third cooler region which adjoins the second cooling region and wherein following the conditioning device the gas is fed to the third cooler region.

8. The method of claim 7, wherein the offgas from the third cooler region is fed to the second cooler region.

9. The method of claim 1, wherein water is fed to the second cooler region.

10. The method of claim 1, wherein the cooling gas fed to the second cooler region has a water content of more than 10% by volume.

* * * * *